Aug. 7, 1956  J. ALLER  2,758,147
PROTECTIVE CAP FOR LEAD-ACID STORAGE BATTERIES
Filed Dec. 10, 1953  2 Sheets-Sheet 1
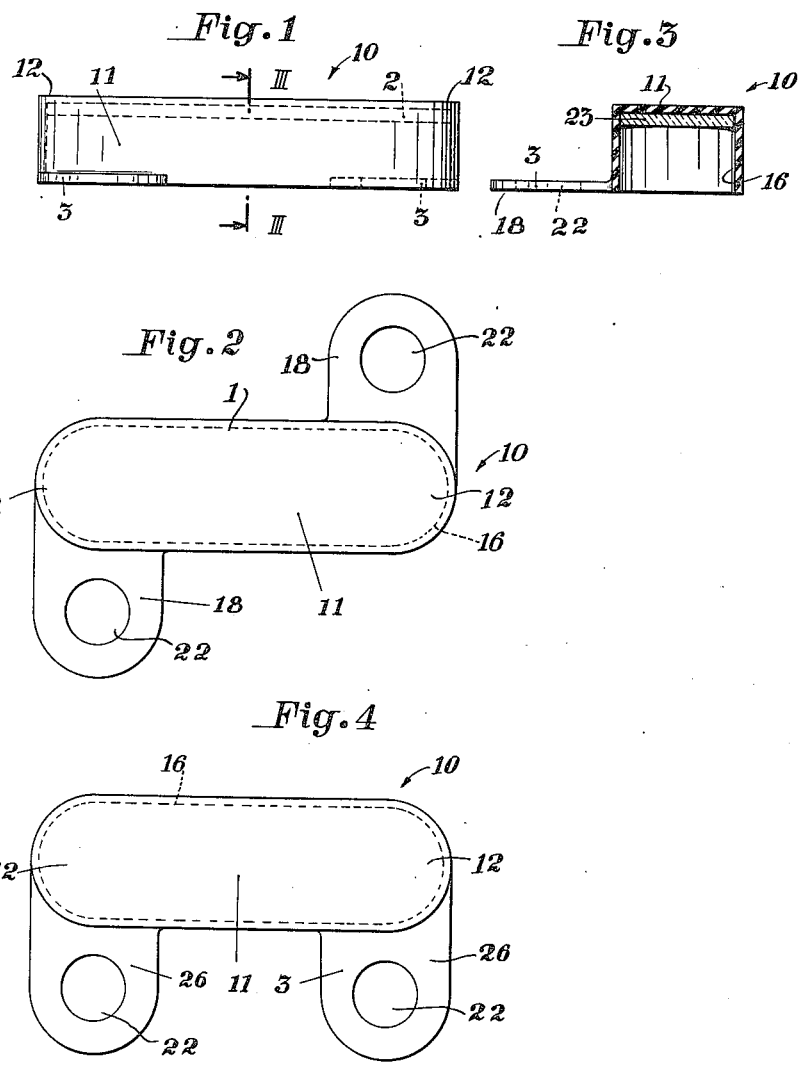
Julius Aller
INVENTOR Aug. 7, 1956  J. ALLER  2,758,147
PROTECTIVE CAP FOR LEAD-ACID STORAGE BATTERIES
Filed Dec. 10, 1953  2 Sheets-Sheet 2

INVENTOR:
JULIUS ALLER
BY
Richardson, David and Nardon
ATTYS

United States Patent Office 2,758,147
Patented Aug. 7, 1956

2,758,147
PROTECTIVE CAP FOR LEAD-ACID STORAGE BATTERIES

Julius Aller, Vienna, Austria

Application December 10, 1953, Serial No. 397,378

Claims priority, application Austria January 3, 1953

7 Claims. (Cl. 136—177)

This invention relates to protective caps for preventing the leakage of acid from the usual screw plugs which are provided with vent holes and fitted in filling openings formed in the top of an electric storage battery of the lead-acid type.

It is known to seal the screw plugs for the filling openings in the tops of storage batteries with resilient padding material. For the purpose of securing the padding, special hinged covers or the like are required which are made from rigid material.

It is an object of the invention to provide improved resilient and non-porous acid resistant means for holding the porous padding against the tops of the plugs.

It is another object of the invention to provide a protective cap for said screw plugs which at the same time protects the electrical terminal means for connecting external utilization conductors to the battery from acid fumes escaping from the vent holes of the filling plugs, the terminals usually extending upwardly, each adjacent to one of the filling plugs.

Other objects of the invention will become apparent to a man skilled in the art as this specification proceeds.

The novel protective caps of the invention comprise a cap body consisting of resilient material and adapted to be removably fitted over said screw plugs, and a padding of absorbent, resilient acid resistant material arranged inside said cap to cover said vent holes. The cap body may consist of rubber or an elastomer, for example; the padding may conveniently be formed of sponge rubber.

Normally the storage batteries are provided with terminals projecting upwardly from the top adjacent to the filling openings and carrying connecting means, such as terminal screws, for connecting external conductors to said terminals. To protect said connecting means from acid fumes escaping through the vent holes, it is a feature of the invention to provide the cap body of the novel protective cap with at least one ear portion extending laterally from said body and formed with an aperture adapted to be engaged over one of said terminals.

The caps according to the invention may be dimensioned so that each cap covers two or more screw plugs.

An embodiment of the invention is illustrated by way of example in the accompanying drawing, in which Fig. 1 is a side view of a closure cap according to the invention, Fig. 2 is a plan view of this closure cap, which has ear portions projecting from two opposite sides at opposite ends thereof, Fig. 3 is a cross-sectional view of the closure cap, taken on line III—III of Fig. 1, and Fig. 4 is a plan view of a modification having two lugs both projecting from the same side of the cap.

Figure 5:
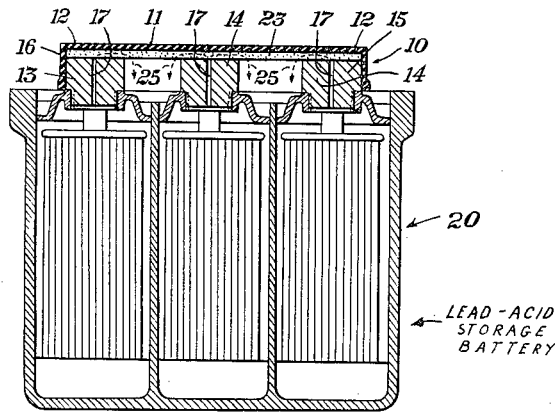
Fig. 5 is a sectional view in elevation showing a cap in accordance with Figs. 1 and 2 fitted on a storage battery of the lead-acid type, the section being taken along the line V—V of Fig. 6.
Figure 6:
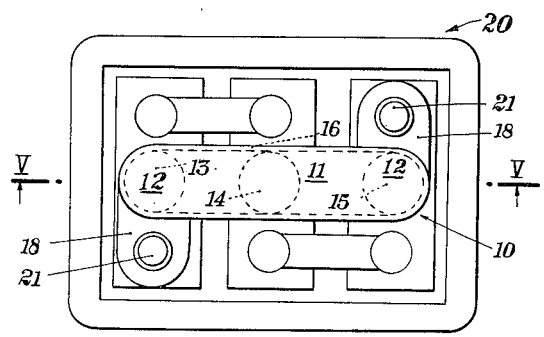
Fig. 6 is a plan view of the arrangement shown in Fig. 5.

Referring to the drawing:

The cap designated generally as 10 comprises an elongated horizontal non-porous cover portion 11 with rounded ends 12 and is illustratively shown in Figs. 5 and 6 extending over and covering three aligned mutually spaced filling plugs 13, 14 and 15 of a three cell or 6 volt storage battery. The cap 10 further comprises a downwardly extending non-porous skirt portion 16 which is connected with the periphery of the cover portion 11 and partially encircles and laterally encloses the end filling plugs 13 and 15 for positioning the cap 10 thereon, while leaving a free space between adjacent ones of the plugs. In each instance, this free space communicates below the bottom edge of the skirt portion 16 with the atmosphere, thus permitting gases to be vented from beneath the cap 10.

Each of the filling plugs 13, 14 and 15 has a vent aperture 17 formed therein which is open at the top of each filling plug and which communicates with the interior of each battery cell above the level of the electrolyte. The cover portion 11 of the cap 10 simultaneously covers all three of the vent apertures 17 in plugs 13, 14 and 15.

The cap 10 shown in Figs. 1 to 3 is provided with non-porous acid resistant ear portions 18 which extend laterally outwardly from the bottom edge of skirt portion 16 at opposite sides of the cap 10 and at opposite ends thereof. The battery 20 shown in Figs. 5 and 6 is provided with the usual upwardly extending upright terminals 21. The ear portions 18 have circular apertures 22 formed therein which fit over the upright terminals 21 so that acid bearing gases escaping from the vent apertures 17 are directed beneath the ear portions 18 and away from the upper end portions of terminals 21 where utilization conductors (not shown) may be connected thereto.

Disposed beneath the cover portion 11 of cap 10 is a layer or pad 23 of porous acid resistant material such as sponge rubber or the like. The porous layer 23 engages against the top surfaces of the filling plugs 13, 14 and 15, partially closing the vent apertures 17, the porous layer 23 being interposed between the impervious lower surface of the cover portion 11 and the tops of the filling plugs. The gases escaping from the vent apertures 17 are thus constrained to pass through the porous layer 23 as indicated by the arrows 25 (Fig. 5) before emerging into the atmosphere from beneath the cap 10 and fine droplets of sulphuric acid which may be entrained with the escaping gases are trapped and retained within the porous layer 23.

Figure 7:
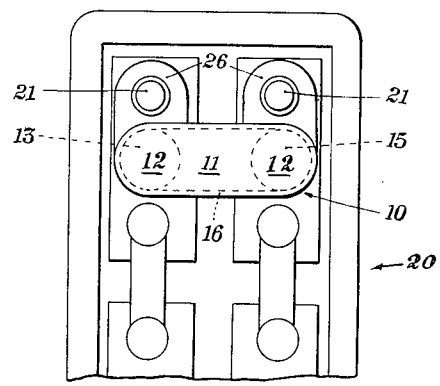
Fig. 7 is a fragmentary plan view showing a cap in accordance with Fig. 4 fitted over two filling plugs of a storage battery.

In the arrangement shown in Figs. 4 and 7, both ear portions 26 are disposed at the same side of the cap 10, thus permitting the ear portions 26 to be fitted over two end terminals 21 both of which are located at the same side of the filling plugs 12.

Preferably, the cover portion 11, the skirt portion 16 and ear portions 18 are all integrally formed of rubber, an elastomer or other acid resistant resilient material by molding or some other conventional method.

I have shown and described what I believe to be the best embodiments of my invention. However, it will be apparent to those skilled in the art that many changes and modifications may be made in the specific illustrative embodiments of the invention which are herein disclosed without departing from the scope of the invention as defined in the appended claims.

What is claimed is:

1. A protective cap adapted to be fitted over a plurality of mutually spaced laterally aligned filling plugs of a lead-acid storage battery, each of said plugs comprising an upwardly projecting circular portion having a vent aperture formed in the top thereof for venting gases from said battery, said cap comprising: an impervious elongated acid resistant top cover portion adapted to extend over a plurality of said aligned plugs and simultaneously cover all of the vent apertures thereof; an impervious resilient acid resistant downwardly extending skirt portion connected with the periphery of said cover portion and adapted for partially laterally enclosing the end ones of said plugs to position said cap thereon while leaving a free space between adjacent ones of said plugs, said free space communicating below said skirt portion with the atmosphere for venting said gases from beneath said cap; and a layer of porous acid resistant material disposed beneath said cover portion of said cap and adapted to engage the tops of said plugs for filtering said vented gases and removing entrained acid therefrom.

2. A cap according to claim 1, wherein said cover and said skirt portions are integrally formed of rubber.

3. A cap according to claim 1, wherein said cover and said skirt portions are integrally formed of an elastomer.

4. A cap according to claim 1, wherein said porous acid resistant material is sponge rubber.

5. A cap according to claim 1, wherein said battery comprises at least one upwardly extending electrical terminal disposed adjacent to one of said filling plugs and in which said cap further comprises an impervious acid resistant ear portion extending outwardly from the lower part of said skirt portion, said ear portion having an aperture formed therein whereby said ear portion is adapted to be fitted over said electrical terminal.

6. A terminal according to claim 5, wherein said ear portion, said skirt portion and said cover portion are all integrally formed of rubber.

7. A terminal according to claim 5, wherein said ear portion, said skirt portion and said cover portion are all integrally formed of elastomer.

References Cited in the file of this patent

UNITED STATES PATENTS

| 2,322,885 | Rogers | June 29, 1943 |
| 2,679,331 | Stoneman | May 25, 1944 |

FOREIGN PATENTS

| 495,054 | Great Britain | Nov. 7, 1938 |
| 728,896 | France | Apr. 18, 1932 |